(Model.)

J. F. & G. H. STEWARD.
LOW LEVEL GRAIN BINDER.

No. 376,488. Patented Jan. 17, 1888.

11 Sheets—Sheet 1.

Witnesses:
John B. Kaspari.
Frank E. Stewart.

Inventors:
George H. Steward
John F. Steward

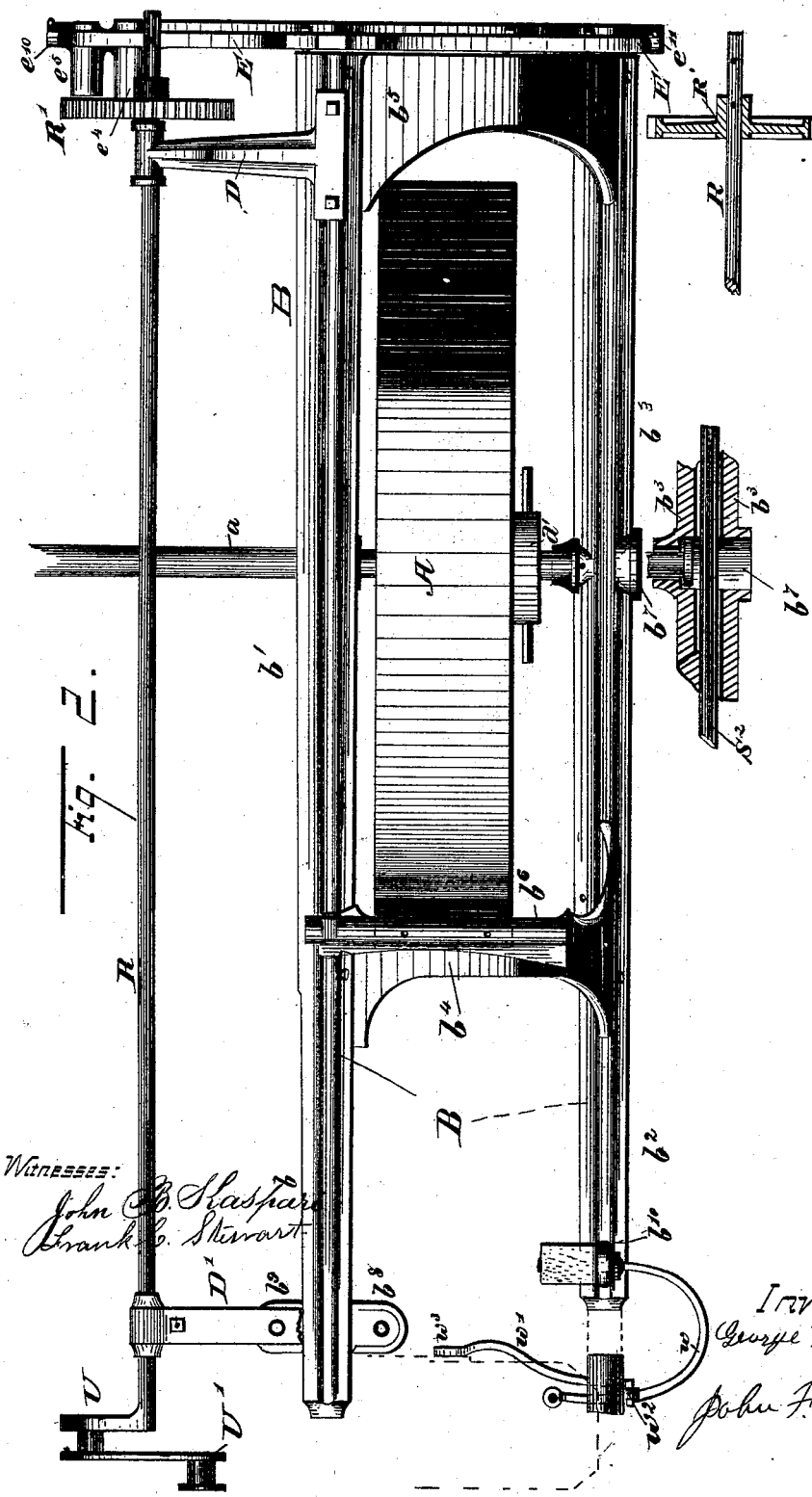

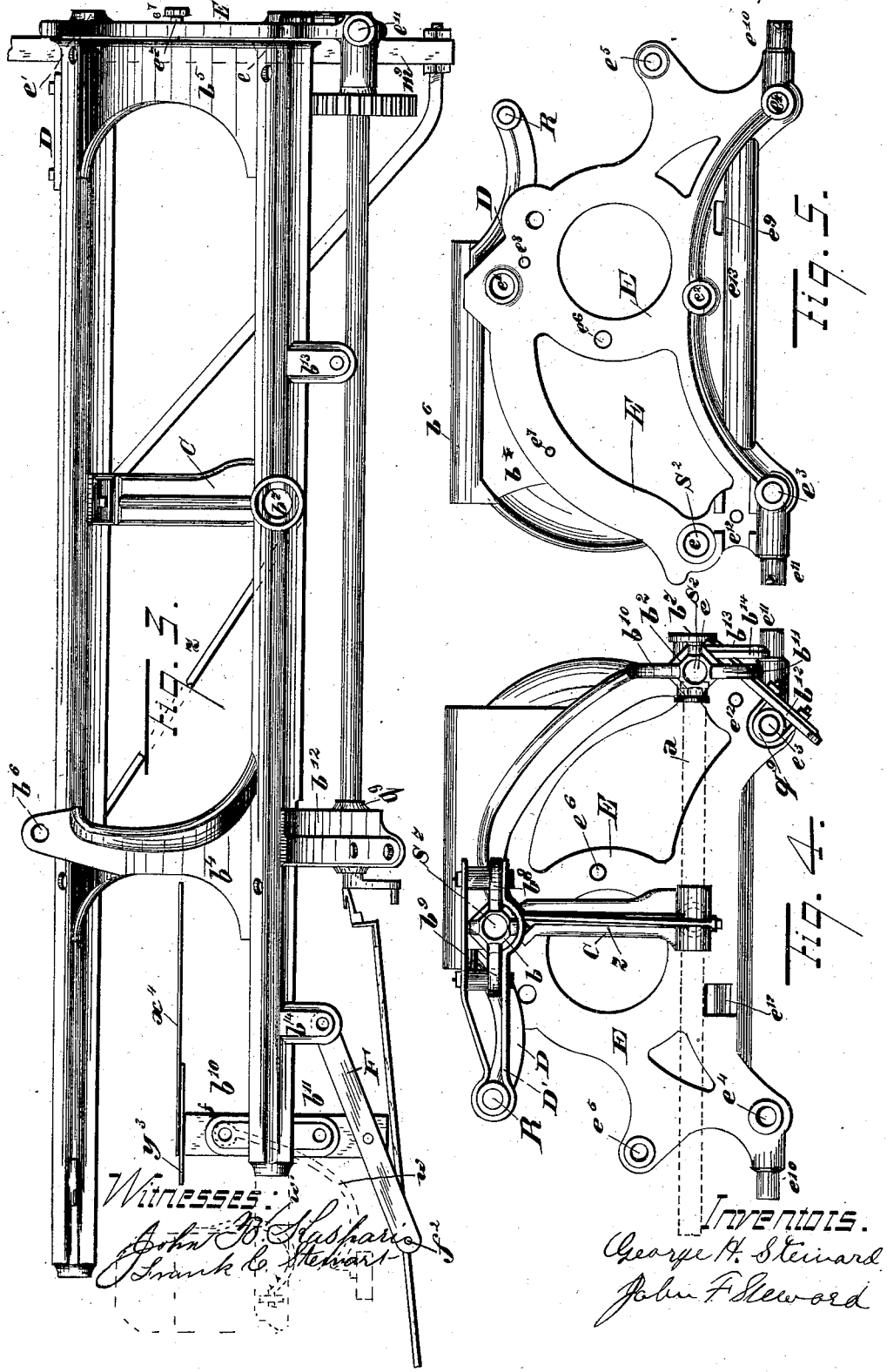

(Model.)

J. F. & G. H. STEWARD.
LOW LEVEL GRAIN BINDER.

No. 376,488. Patented Jan. 17, 1888.

11 Sheets—Sheet 4.

(Model.)
J. F. & G. H. STEWARD.
LOW LEVEL GRAIN BINDER.
No. 376,488. Patented Jan. 17, 1888.
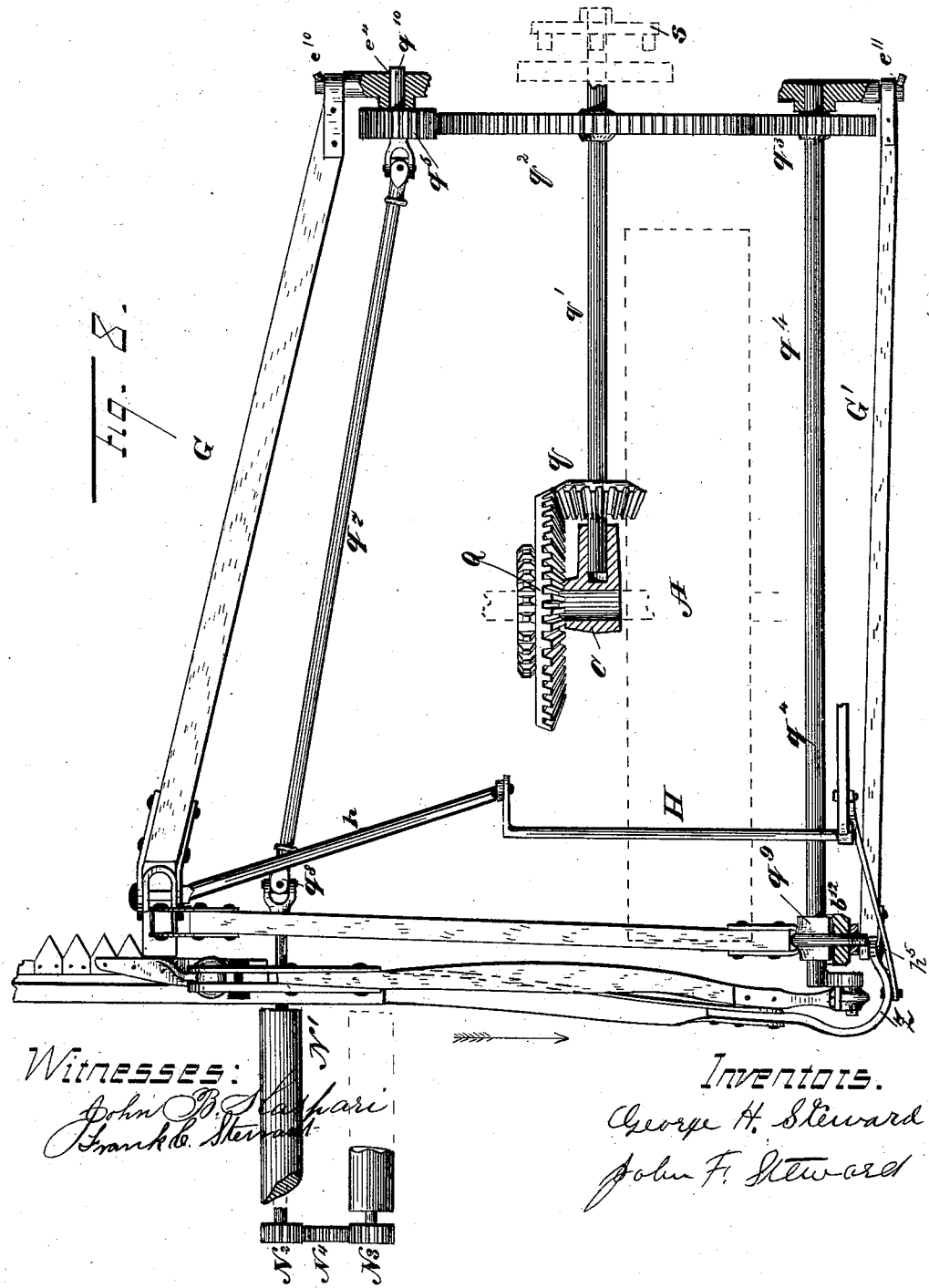

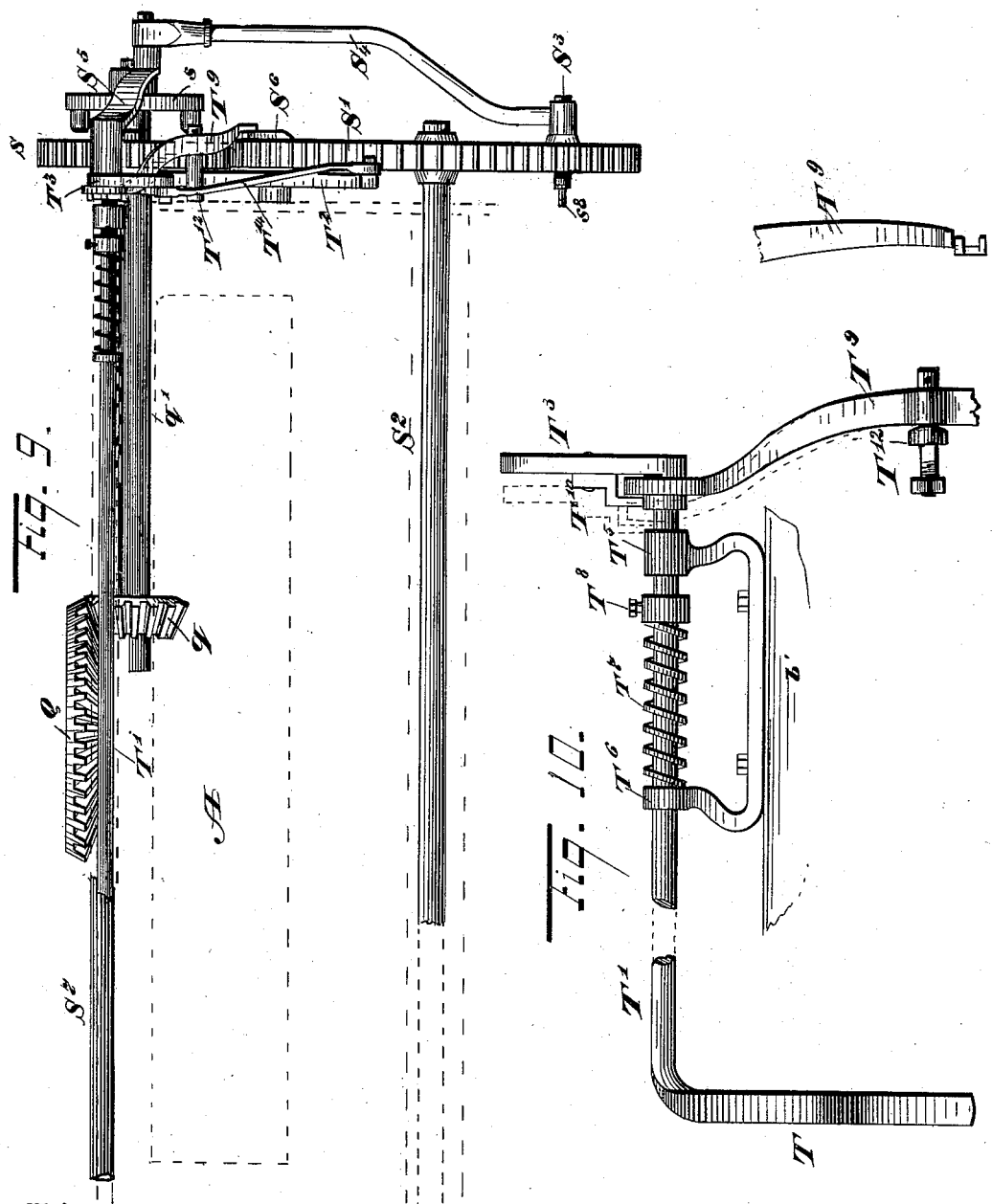

(Model.)

J. F. & G. H. STEWARD.
LOW LEVEL GRAIN BINDER.

No. 376,488. Patented Jan. 17, 1888.

Witnesses:
John B. Haspari
Frank C. Stewart

Inventors:
George H. Steward
John F. Steward (Model.)
J. F. & G. H. STEWARD.
LOW LEVEL GRAIN BINDER.
11 Sheets—Sheet 8.
No. 376,488.   Patented Jan. 17, 1888.
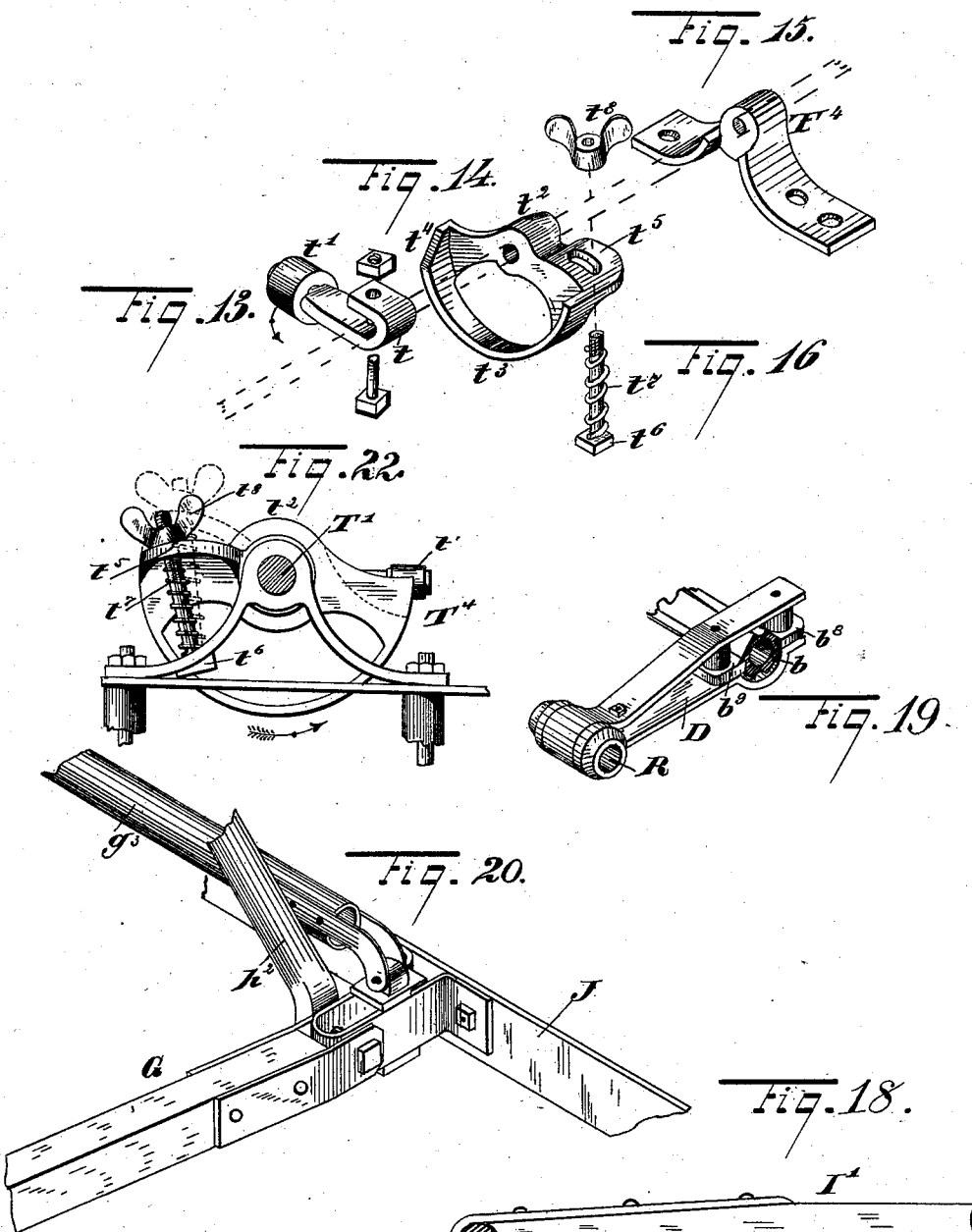

(Model.)
J. F. & G. H. STEWARD.
LOW LEVEL GRAIN BINDER.
No. 376,488. Patented Jan. 17, 1888.
11 Sheets—Sheet 9.
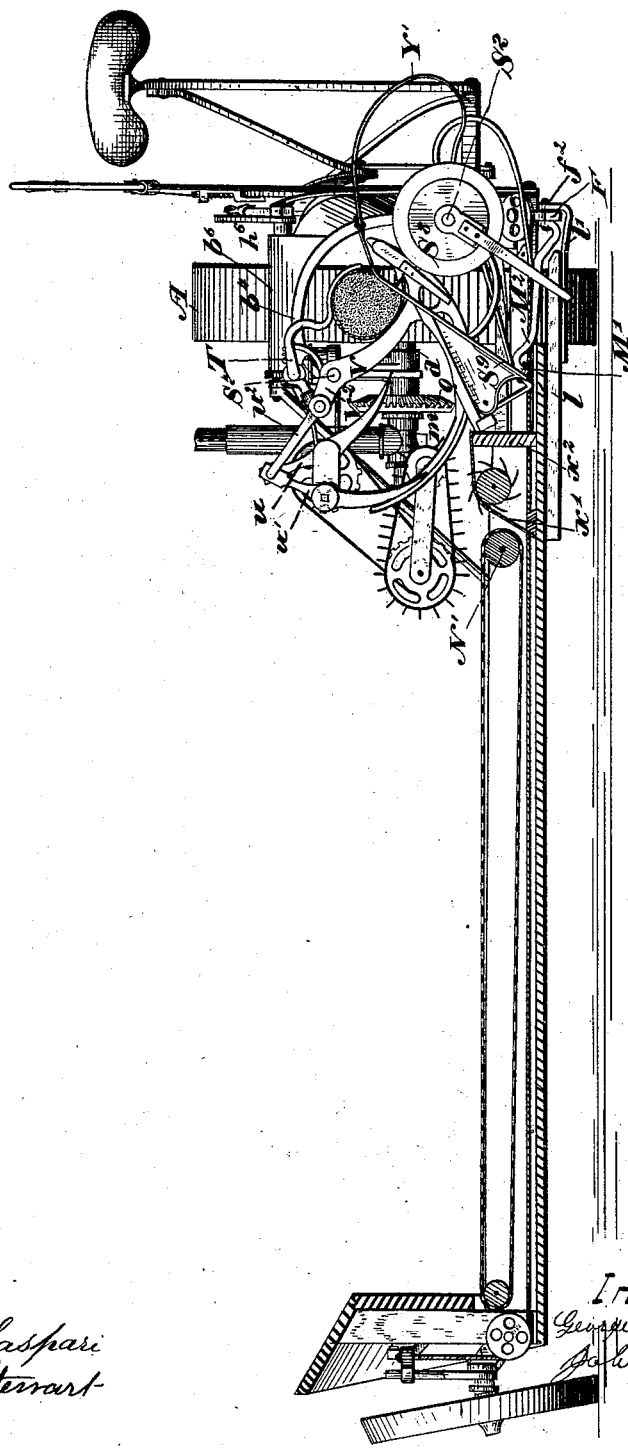
Witnesses:
John B. Kaspari
Frank C. Stewart
Inventors.
George H. Steward
John F. Steward (Model.)
J. F. & G. H. STEWARD,
LOW LEVEL GRAIN BINDER.
11 Sheets—Sheet 10.
No. 376,488.
Patented Jan. 17, 1888.
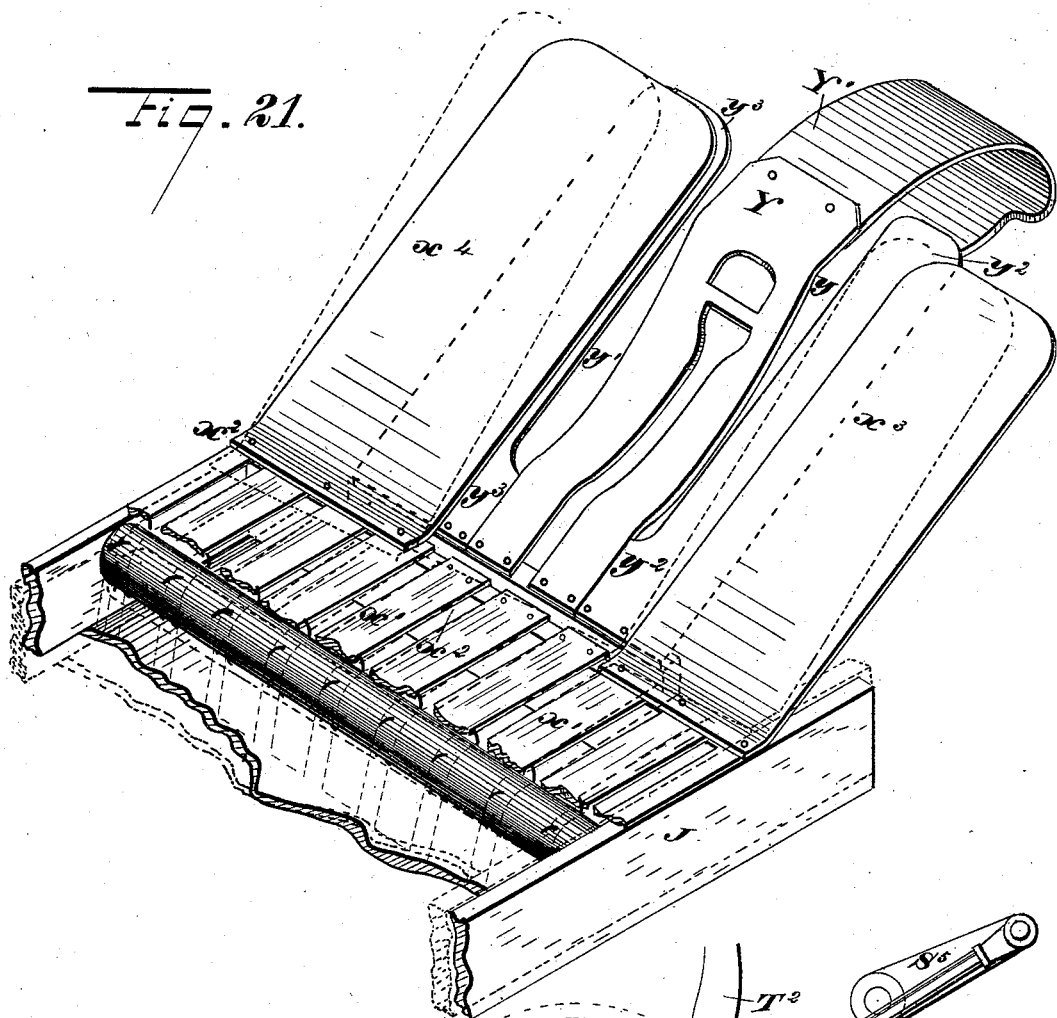
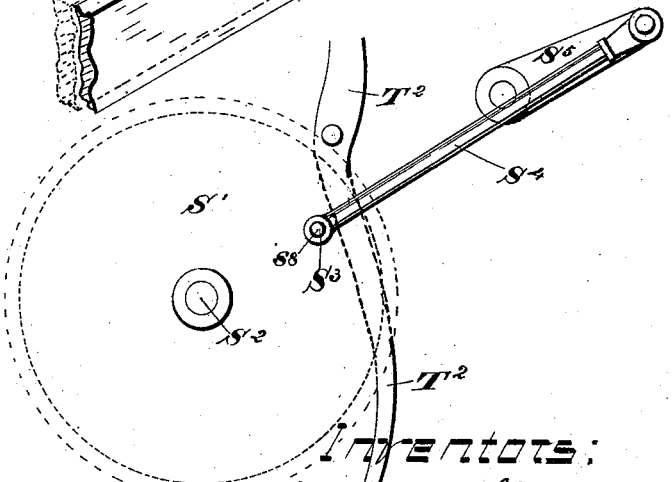

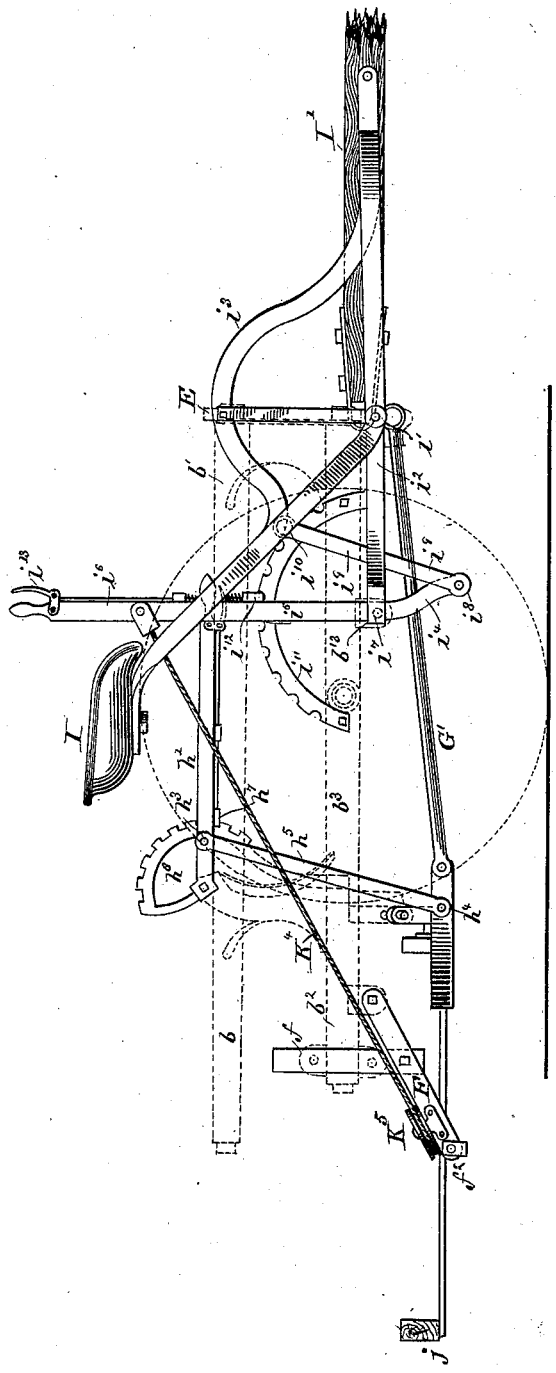

United States Patent Office.

JOHN F. STEWARD, OF CHICAGO, AND GEORGE H. STEWARD, OF PLANO, ILLINOIS.

LOW-LEVEL GRAIN-BINDER.

SPECIFICATION forming part of Letters Patent No. 376,488, dated January 17, 1888.

Application filed July 5, 1883. Serial No. 100,000. (Model.)

*To all whom it may concern:*

Be it known that we, JOHN F. STEWARD, of Chicago, in the county of Cook and State of Illinois, and GEORGE H. STEWARD, of Plano, in the county of Kendall and State aforesaid, have invented certain new and useful Improvements in Low-Level Grain-Binders, of which the following is a full description, reference being had to the accompanying drawings.

The object of our invention is to remove the objections that have prevented this class of machines from being successful as compared with other harvester-binders, among which objections are—

First, the impossibility of making a perfect discharge of the bundle and preserving the poise of the machine, as in machines having the platform abreast of the master-wheel, whether the bundle be discharged into a space between the end of the platform and the wheel or delivered over the wheel. In either of these cases the poise is preserved, but the bundle is disposed of with difficulty.

Second, the great disturbance of the poise on the master-wheel when the platform is in the rear of the wheel, as in all "rear-cut" machines having the binding mechanism also in the rear.

These objections we have fully removed; and our invention consists in such an organization of mechanism that the preponderance of weight shall be in front of the wheel, and yet have the platform in the rear, and in arrangements and in details of construction that will be fully pointed out.

Figure 1:
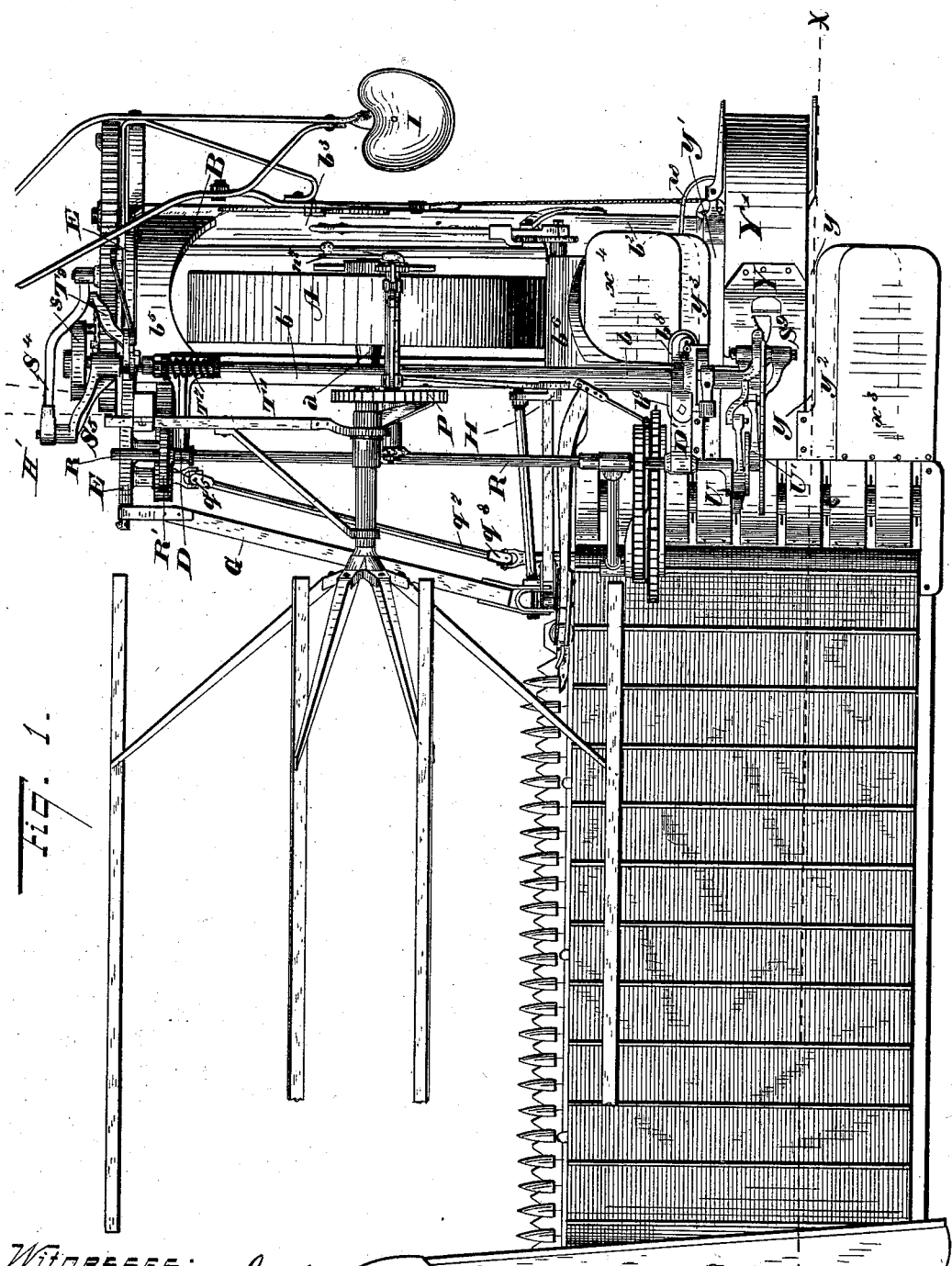
Figure 6:
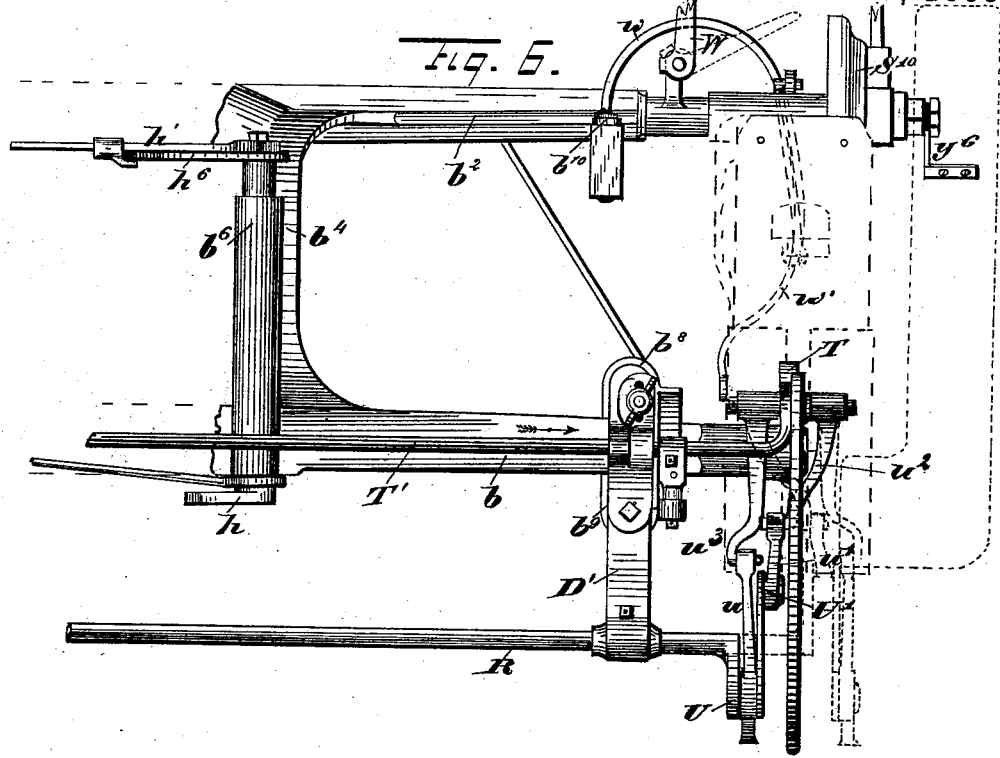
Figure 7:
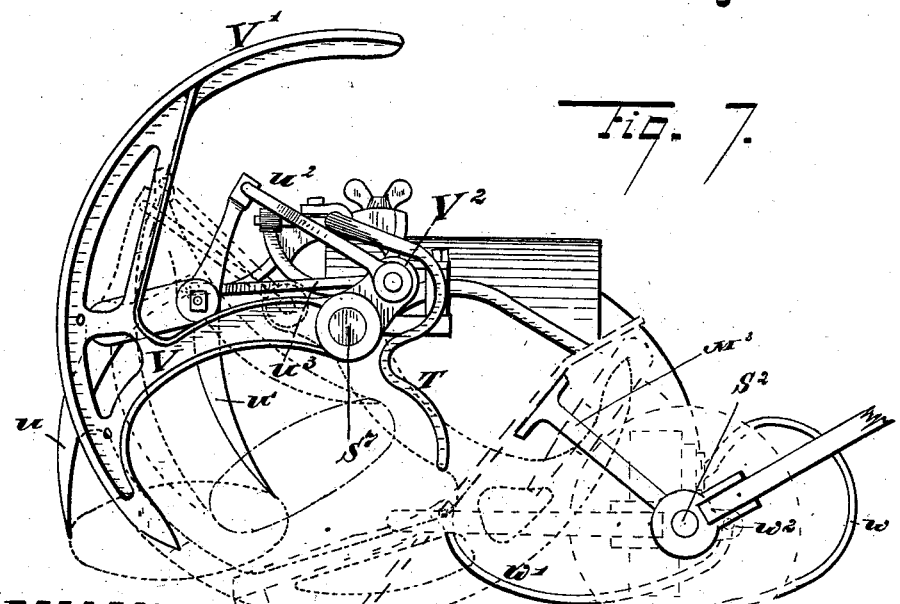
Figure 11:
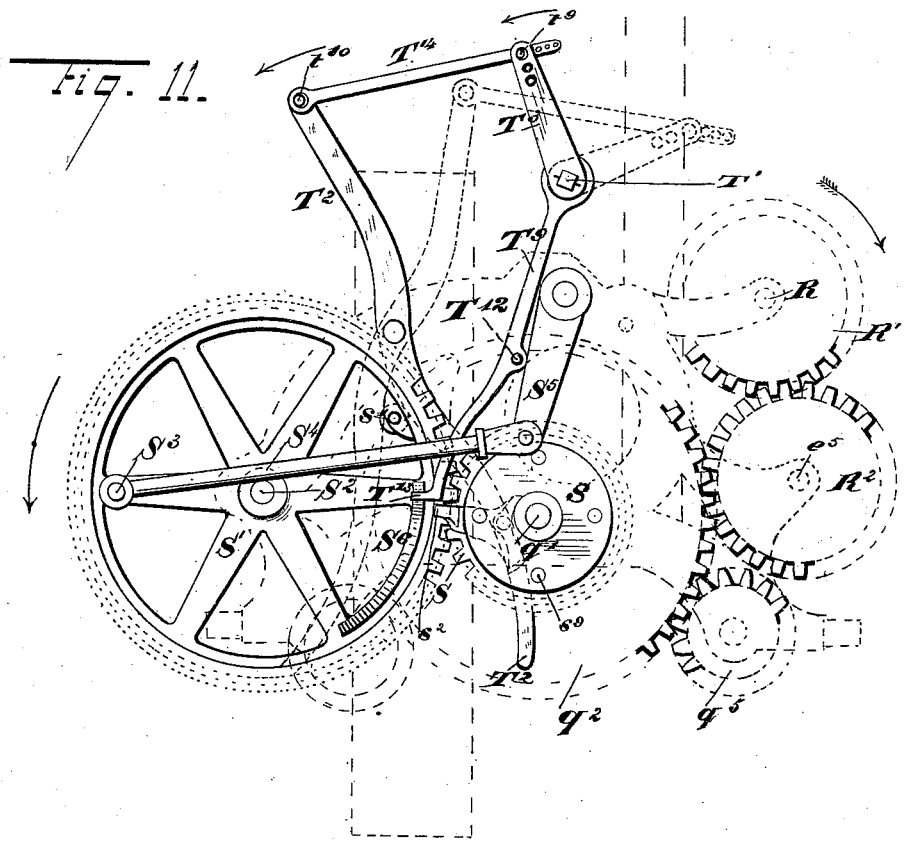
Figure 12:
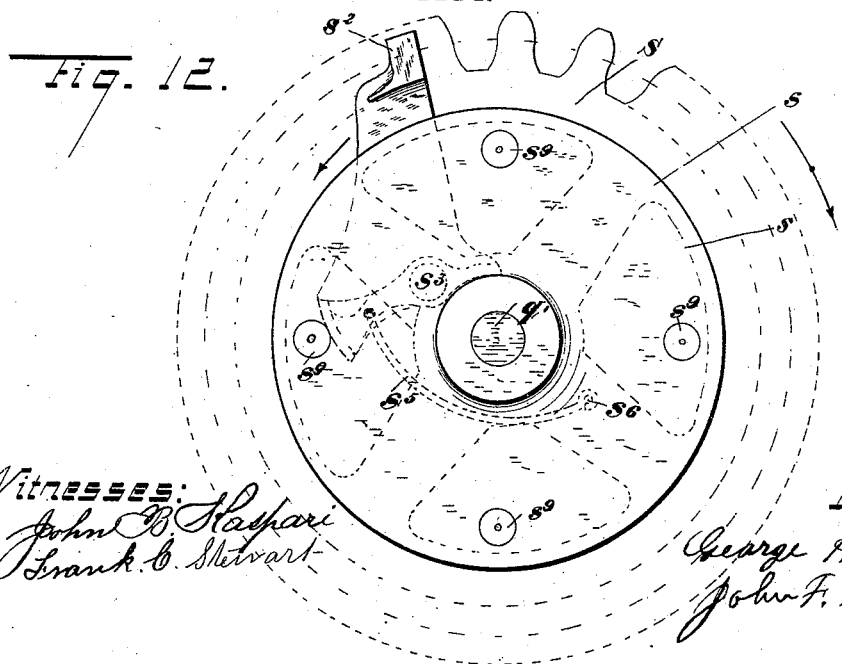

Figure 1 is a plan view of the machine nearly entire, showing the platform with its front edge as close as possible to the face of the wheel and all of the gearing, whether for driving the cutting apparatus or the binder mechanism, in front of the wheel. Fig. 2 is a plan view of the frame and certain other parts. Fig. 3 is a stubble side view of the frame with certain other parts. Fig. 4 is a rear end view of this frame. Fig. 5 is a front end view of the same. Fig. 6 is a plan view of such parts of the packing and binding mechanism as are located in rear of the main wheel, all of the forward extensions being broken away. Fig. 7 is a rear end view in dotted and full lines of the same parts. Fig. 8 is a plan view of the organization of parts for connecting the platform adjustably to the gearing-frame, and also the sickle and canvas driving mechanism. Fig. 9 is a plan view of the gearing and connections for moving the needle and knotter-driving shaft, in part, also the compressor-shaft and its operating-levers and clutching mechanism. Fig. 10 is a stubble side view of the compressor-shaft, (its middle portion broken away,) the trip-spring, the compressor-arm, and the upper part of the clutch-tripping arm. Fig. 11 is a front elevation of the binder-gearing proper and such parts as connect with it to give movement to the needle and band-uniting mechanism and to the tripping and compressing device. Fig. 12 is a front view of the clutching mechanism. Figs. 13 to 16, inclusive, show the construction of the device for causing the compressor-shaft to act also as a tripping-shaft. Fig. 17 is a sectional rear view of the machine as if cut on the line $x$ $x$ of Fig. 1. Fig. 18 shows the means of fastening the rear end of the tongue to the frame. Fig. 19 is a perspective view of the rearmost packer-shaft bracket. Fig. 20 is a perspective view showing the manner of connecting the draft-bar and other parts to the finger-bar. Fig. 21 shows the binder-platform. Fig. 22 is a front side view of the means for adjusting the tripping mechanism. Fig. 23 is a front end view of the compressor-moving bar. Fig. 24 is a side elevation showing the construction of the platform-tilting mechanism and other parts.

A is the master-wheel; $a$, its axle.

B is the master-wheel frame, the construction of which to adapt it to its work forms an important part of our invention. It is, in fact, two frames in one, as it serves as a mounting for all of the binder and harvester gearing as well as a wheel-frame. We will first describe such part of it as serves only as the binder-frame, and, treating it as such only, it consists of two arms that overreach and underreach the binder-table, which arms form supports for the needle-shaft and the knotter-driving shaft. These arms project rearwardly from the strong cross-bar $b^4$. The needle, compressor, packing, and band-uniting mechanism overhang these arms, as shown in Fig. 6.

The general arrangement so far is not uncommon in binders.

It is usual to locate the binder-gearing on the cross-bar $b^4$; but the location of the gearing at this point gives the binder uncontrollable weight unless a counterpoise of deadweight is placed forward of the axle.

Instead of terminating the shafts at the usual point, we extend them far forward, and with them the parallel longitudinal bars of the frame, and connect the latter with another strong cross-bar, $b^5$, and upon this we mount the gearing. The extensions of the frame we make so great that we can place the master-wheel within the parallelogram formed by the parts $b'$, $b^3$, $b^4$, and $b^5$, as seen in Fig. 2. The sleeve-like longitudinal bar $b\ b'$ is constricted at its extreme end, and thus forms a bearing for the needle-shaft. The longitudinal bar $b^2\ b^3$ is similarly constructed at its end and forms a bearing for the knotter-driving shaft. It may be deemed preferable in some cases to reverse this and place the needle at the lower sleeve and the knotter-driving shaft above. Upon the bar $b$ are the horizontally-projecting lugs $b^8$ and $b^9$, and upon the arm $b^2$ are the vertical lugs $b^{10}$, $b^{11}$, and $b^{12}$. (See Fig. 3.)

$b^6$ is a long horizontal sleeve crossing the frame, formed upon the cross-bar $b^4$, which sleeve forms a journal-bearing for the machine-tilting shaft.

$b^7$ is a large eye passing crosswise through the longitudinal bar $b^3$ of the frame, about its middle, through which the drive-wheel axle is thrust, and which forms a bearing for the stubble end of the axle. The construction of the bar $b^3$ at this point is shown in the detail adjoining it in Fig. 2, where the axle is seen to be provided with a head and the eye reduced beneath it. After the axle is thrust in place, the knotter-driving shaft $S^2$ is put in place by sliding it through from one end of the hollow longitudinal bar $b^3$ to the other. Having the head so seated, the axle cannot be drawn out, and by this we make the said axle serve as means for holding the wheel which is keyed thereto from moving sidewise in the frame.

$b^{13}$ is a downwardly-projecting lug on the bar $b^3$ a little forward of the axle. The bar $b'$ of the frame being well above the axle, the hanger C is provided, having at its lower extremity a journal-bearing for the drive-wheel axle, and upon the same plane and at a right angle thereto a like bearing for the shaft $q'$, as seen in Fig. 8. This hanger is braced by a strong rod, $z$, passing from beneath it, as seen in Figs. 3 and 4, to the upper longitudinal bar of the frame.

D and D' are horizontally outreaching arms extending, respectively, from near the ends of the longitudinal bar $b'\ b$, the former bolted upon the bar itself and the latter to the lugs $b^8$ and $b^9$, as seen in Figs. 2 and 6, and they have at their extremities bearings for the packer-shaft. D may be of ordinary gray iron; but the one D' we make of wrought-iron, in order that it may be light, and bolt it as seen in Fig. 4. The construction of the latter is shown in Fig. 26, where the packer-shaft bearing is seen to be a sleeve, which is clamped into a partial eye formed by bending the metal around it.

E is a plate of iron of form suitable for supporting all of the frontal working parts of the machine, the tongue, and the draft-bars. By referring to Figs. 3, 4, and 5 the construction may be better seen. It is of such thickness as to have sufficient rigidity, and at such points as subjected to greatest strain has strengthening-ribs. Through it is the journal-bearing $e$ for the front end of the knotter-driving shaft, and also the bearing $e'$ for the needle-shaft.

$e^2$ is the bearing for the constantly-revolving shaft $q'$.

$e^3$ is the bearing for the sickle-driving shaft.

$e^4$ is the bearing for the front end of the canvas-driving shaft; $e^5$, an eye in which is secured a stud on which an intermediate gear revolves; $e^6$, an eye in which is a stud on which the tripping-lever vibrates, and $e^7$, $e^8$, and $e^{12}$ are holes for the bolts that secure the plate to the cross-bar $b^5$ of the frame.

$e^9$ is a slot cut through the plate in such position in relation to the cylindrical strengthener $e^{13}$ that an iron strap may be made in part to encircle it, and, being riveted to the butt of the tongue, form means for hinging the latter to the machine. (See Fig. 24.)

$e^{10}$ is a stout trunnion at the inner or grain end of the frame, upon which is jointed one draft-bar; and $e^{11}$, another trunnion at the opposite extremity of the frame, on which is jointed another draft-bar, G', by which draft-bars the platform is connected to the gearing-frame.

At $e^{12}$ is a seat, into which is secured a certain part to which the tongue-brace is pivoted.

The main-wheel axle $d$ is elongated at its grain end, and upon this we mount the reel M upon the inside.

The reel shown will form the subject matter of another application, and need not be here described.

Q is a bevel-gear firmly secured to the axle, and which meshes into the pinion $q$ on the shaft $q'$, having journal-bearings in the lower end of the hanger C and in $e^2$ of the frame E.

$q^2$ is a large gear (see Fig. 8) keyed to this shaft, and which meshes into the pinion $q^3$ on the crank-shaft $q^4$. This shaft has a bearing, $e^3$, in the frame E and another at $q^9$, bolted to the lug $b^{12}$. From the crank of this shaft to the sickle-head reaches the usual pitman, and which, on account of the variability of the sickle in relation to the main frame, has a ball-and-socket connection. This shaft is made of such length, notwithstanding its labor is in rear of the master-wheel, that its gearing is in front. Meshing into $q^2$ is also the pinion $q^5$, keyed to a very short shaft, $q^{10}$, journaled in the bearing $e^4$, Fig. 8.

To the short shaft is joined, by a universal joint, the shaft $q^7$, and this last shaft extends backward toward the platform, where, by universal joint, it is connected at $q^8$ to the platform-canvas roller-shaft. The rising and falling of the front edge of the platform in tilting produces a slight variation in the distance from the front of the frame to the universal joint $q^8$. To meet this demand the pinion $q^5$ is thicker than the gear meshing into it, and its short shaft is permitted to slide endwise in its journal-bearing. This movement in practice is slight; but we find it so great as to require providing for.

The location of the packer-shaft is shown in Figs. 1, 2, 4, and 5, where it is indicated by the letter R, and carries on it the gear R'.

In Fig. 11 is shown the wheel $q^2$ in dotted line, and another, R$^2$, which revolves on a pin inserted in the eye $e^5$ of the frame E.

The motion is imparted to the gear R' through the idle-gear R$^2$ by the gear $q^2$ in the direction indicated by the arrow.

Fig. 11 shows the wheel $q^2$ in its relation to the three pinions which it drives—namely, the cutter-crank-shaft pinion, the packer-shaft pinion, and the canvas-driving pinion.

The system of gearing for carrying or moving the band-carrying and band-uniting mechanism consists of the large pinion S, mounted loosely upon the shaft $q'$, which meshes into the gear S', keyed to the knotter-driving shaft S$^2$, which has its front bearing in the eye $e$ of the frame E.

S$^3$ is a wrist on the wheel S', and S$^4$ is a pitman connecting it with the needle-shaft crank S$^5$, of radius somewhat greater than that formed by the wrist on the wheel. The revolution of the wheel S' gives, by this means, an oscillating movement to the needle.

In Figs. 9 and 11 the parts are shown in their position when the needle is drawn home, while in Fig. 1 the needle is thrown upward or retracted.

The gears S and S' are two to one in their relative diameters, and the latter making a whole revolution as it does to produce a complete forward and return movement of the needle, the gear S', its driver, is required to make two revolutions. Both of these gears S and S' overhang the shaft-bearings, the former loose on the shaft $q'$, but periodically permitted to lock thereto by the tripping mechanism.

Keyed to the shaft $q'$, forward of the gear S, is a strong disk, $s$, having four anti-friction rollers ranged near its periphery upon its inner or rear face. These rollers are in effect but the equivalents of ratchet-teeth. Upon the wheel S is pivoted, near its hub, the pawl $s^2$ on the pin $s^3$. (Shown in dotted line in Fig. 12.) This pawl has a strong heel, against which the rollers $s^9$ abut when engaging it.

$s^5$ is a spring with end bent into a hole in the pawl and into a hole in one of the spokes of the wheel at $s^6$. This spring is curved, and its effort to straighten throws the pawl to its position of engagement with the rollers. The pawl has an outreaching end, which engages with a clutch-tripping arm at intervals, and when this occurs the said pawl is thrown out of engagement with the rollers on the disk.

So far the clutching mechanism is in common use and is well understood, and will not be further described.

Referring now to Fig. 17, the knotter-driving and needle shafts are seen from their rear ends, where S$^7$ is the needle-shaft, and S$^2$ the knotter-driving shaft. S$^8$ is the knotter and holder driving gear, provided with an arm for discharging the bundle. S$^9$ is the breast-plate, and over this the swath of grain is passed, and through it the needle is thrust in laying the twine into the knotter. (Not shown.)

The needle is of a common form; but its especial construction will be spoken of when treating of the packing mechanism, with the requirements of which it conforms.

T is the compressor, of the form shown in Figs. 7 and 17, consisting of a shaft having torsional elasticity, supported in bearings T$^3$ near the front end of the frame, (for the construction of said bearing see Fig. 10,) and in the bearing T$^4$, Fig. 15, at the needle end of the main frame. This shaft rocks freely in these bearings and is permitted a slight longitudinal movement, as will be hereinafter described.

This shaft at its rear extremity has an arm curved to give conformation to the gavel, and near the shaft curved well upward to avoid contact with the heel of the needle. As a compressor alone this arm T is in its movements substantially synchronous with the needle, but in a reverse direction—that is to say, they approach and recede from each other, the gavel being between.

In order to give the arm, as a compressor, elasticity of action, we forge it (from preference) upon the long shaft T', (see Figs. 9 and 10,) and depend upon torsional resistance only for elasticity of compression. Proportioned as the shaft is, reaching as it does from end to end of frame, as seen in Fig. 1, and being of steel of suitable diameter, (in practice five-eighths of an inch round steel,) we find it so well qualified for its work that no other spring is needed. These proportions may be varied to suit any conditions of application.

Referring now to Figs. 9, 10, and 11, the action of the compressor will be treated.

The bolt passing through the hole $e^7$, which bolt is one of those for securing E (see Fig. 3) to the frame, is shouldered and forms a pivot on which rocks the lever T$^2$. The compressor-shaft is squared at a point opposite the lever T$^2$, (such point being its end,) and upon it is tightly secured the arm T$^3$.

T$^{14}$ is a connecting-rod attached at one end, by pin $t^{10}$, to the arm T$^2$, and at the opposite end attached, by pin $t^9$, to the arm T$^{13}$. The rod is provided, as in Fig. 11, with a series of pin-holes, so that the distance between the arms T² T³ may be changed, and the arm T provided with a series of holes, so that the distance of the connection from its axis may be varied.

s' is a roller upon a stud projecting from a lug within the web of the wheel S'. This roller projects rearwardly a distance equal to its thickness and that of the lever T², which lever is so shaped below its pivotal bolt that the roller in its orbital movement shall give it vibration in one direction. The location of the roller s' is such as to time the movement of the lever T², and hence the compressor, to that of the needle. The timing of the parts—that is, the adjustment of the said parts in relation to each other to produce the various actions in proper time and order—is such that where the wheel S' is at that part of its movement shown in Fig. 11 the knotter is operating. The needle-shaft crank S⁵ is drawn to thrust the needle home. The roller s' has traveled along the arm T² to the position of greatest compressive movement of the compressor.

With the parts in the position shown in Fig. 11 there would be disastrous rigidity were it not for the torsion of the compressor-shaft or equivalent elasticity from some source. By the time the binding is completed the roller s' has passed out of effective contact with the lever T², and the compressor may yield to permit the discharge of the bundle.

As we depend on the compressor-arm for resistance in the matter of compacting the gavel and self-sizing the same, it must be brought home (after it has been moved away by the passage of the bundle) to its position shown in Fig. 7, but when so brought be free to yield. This return movement is effected by a pin, s⁸, which is in effect an extension of the wrist S³, projecting through the wheel S', (see Fig. 9,) and which is of such length and its radial distance such as to operate the lever T² in exactly the same manner as does the roller s'. Its position upon the wheel is such as to act upon the lever near the end of the binding operation and to pass just out of contact therewith, so that when the binding mechanism is at rest the lever will be permitted slight movement. (See Fig. 20.) This slight movement is but to allow the proper action of the compressor-arm in its office as a tripping-arm.

Aside from the actual movement of the arm so far as described, the compressing mechanism and the tripping mechanism are in the main independent.

Referring now to Fig. 13, the dotted lines represent the compressor-shaft. t is a short stout arm having a partial eye formed by bending it nearly around the shaft. Into this a hole is drilled close to the shaft, and by the use of a strong bolt the parts are drawn (by the yielding of the metal) to hug the shaft tightly. Upon the end of this arm is placed an antifriction roller, t'. t² is a plate with outreaching arms, which terminate in an arc concentric with the eye in the plate and the flange t³, having at one end the incline t⁴. This last-described piece closely adjoins the bearing-bracket T⁴. t⁵ is a wing projecting from the side of one of the arms from the plate t² toward the bearing-bracket T⁴ and having a slot. t⁶ is a bolt which passes loosely up through a hole in the bearing-bracket T⁴, thence through the slot in t⁵, and takes the thumb-nut t⁸. Between the bearing-bracket T⁴ and t⁵ is the coiled-wire spring t⁷, surrounding the bolt. (See Fig. 16.) By means of this thumb-nut and spring the relative position of the flange t³ may be adjusted to that of T⁴.

In Figs. 13, 14, and 15 the parts last described are shown as if separated in their positions relative to each other, but strung along on the shaft.

It will be seen that if brought together the roller t' will rest at the foot of the incline t⁴, and that if the shaft is rocked to move the arm in the direction indicated by the arrow the roller will be forced to climb the incline, which could not take place without producing longitudinal movement of the shaft in the direction indicated by the arrow in Fig. 6, for the production of which this device is wholly designed. It is thus seen that our compressor is made to serve as a yielding tripping-arm; but no means has been described for varying its resistance—a requisite in varying the degree of compaction of the gavel.

It is plain that if the compressor-shaft is resistingly held from longitudinal movement greater pressure upon the tripping and compressing arm will be required to make the roller climb the incline t⁴, and that any variation in this resistance will vary the degree of compaction of the gavel.

Referring now to Fig. 10, the means for producing adjustable elastic resistance is shown. The bearing T⁵ is upon a bracket bolted to the top of the main frame and having a supplemental bearing, T⁶, which forms an abutment for one end of the coiled spring T⁷, surrounding the shaft. The shaft moves freely through these bearings and in part through the spring.

T⁸ is a collar with set-screw surrounding the shaft, against which the other end of the spring rests. It is plain that if the collar T⁸ is so placed as to give the spring more compression greater resistance to the longitudinal movement of the shaft will be produced. Upon this as an equivalent device we depend for adjustability of the degree of compaction of the bundle to a great extent. Means for adjusting the slope of the incline t⁴ will vary this. We shall claim this longitudinal movement for the purpose of tripping, broadly, and hence do not wish to limit ourselves to the specific means shown for producing and regulating it.

As we depend upon the position to which the tripping and compressing arm is brought before tripping for predetermining the size of the bundle, it will be understood that the point to which the arm recedes under the influence of the forming bundle should be such that at that instant the roller $t'$ will have climbed the incline so far as to have produced sufficient longitudinal movement of the shaft to permit the engagement of the clutching devices.

If the thumb-screw is turned downward on its bolt, the rim having the incline $t^4$ will be moved in the direction indicated by the arrow in Fig. 29, and this very movement will force the incline behind the roller, so as to move the shaft $T'$ part of the way toward tripping the clutch by longitudinal movement, and this without having affected the compressor-arm on its axis of vibration, and hence a smaller amount of grain need be compacted against it to trip. If the thumb-screw is turned off from the bolt the spring $t^7$ will move the incline in the reverse direction and carry it to the position shown in dotted line in Fig. 22, and the compressor-shaft will rock farther before the roller begins the ascent of the incline to draw the shaft to trip, and thus larger gavels will be produced.

The arm $t$ may be made adjustable on the shaft, and, in fact, is so, by loosening its bolt and moving it to any position desired.

The arm $T^3$ is firmly secured to the shaft, and hence moves with it as the latter is carried endwise, and, for convenience, we connect the clutch-tripping arm or "trip stop" $T^9$ as follows: The hub of the said arm $T^3$ being cylindrical, (see Fig. 10,) the clutch-tripping arm is formed with an eye that loosely surrounds it. A keeper, $T^{10}$, is riveted to the arm $T^3$, that completes the connection of the eye of the detent to the hub.

$T^{12}$ is a strong stud projecting from the hole $e^6$ in the frame E, constructed as shown in Figs. 10 and 11. On this stud vibrates the clutch-tripping arm, which is free to move, the eye at its pivot being so loose on the stud as to permit it to rock to the position shown by dotted lines in Fig. 10. In this figure the lower end of the clutch-tripping arm is broken off and moved to an adjacent position, and its foot is shown in its relation to the pawl. The position of rest of the lever is that shown by full lines; but when the shaft has been given movement to trip it is drawn to that shown by dotted lines, when the pawl is free to engage in the usual manner.

Means must be provided for bringing the clutch-tripping arm back into its position for arresting the pawl. This is done by the spring $T^7$. The latter thus serves two purposes. As it moves the shaft endwise, the clutch-tripping arm connected therewith is moved. The gear S making, as it does, two revolutions to that of one operation of the binding mechanism, the pawl twice approaches the clutch-tripping arm, and if permitted would engage it. When the arm T is moved out to trip and remains there—as when held by the gavel being bound—the clutch-tripping arm will remain out of the path of the pawl; but when running the binder around empty, (as in threading up,) the compressor not being held back to the position of tripping, the clutch-tripping arm will engage the pawl and disengage the clutching mechanism with the binder at its half-revolution. To prevent this we provide the wheel $S'$ with a cam, $S^6$, at its rim, and from the foot of the clutch-tripping arm we throw out a toe (see Fig. 11) that shall engage said cam and at the proper instant be moved somewhat beyond the tripping position and there held until the pawl has passed.

The means for giving rotation to the packer-shaft has already been described. Its driving-gear $R'$ may be pinned to the shaft in either one of two positions, or, rather, the position of the gear being constant, the shaft may occupy either one of two positions longitudinally in relation thereto.

Referring to Fig. 2, the shaft and gear are shown detached and in section, the former having two holes for the pin that passes through the hub of the latter.

The construction of the packers will now be described and this longitudinal adjustment of the shaft be understood.

The cranks U and $U'$ are so constructed that they may be very close side by side, as seen in Fig. 2, so that they will occupy the least possible space. The first is but a bend in the shaft itself, provided with a wrist, upon which we place the packer $u$, and from the end of this wrist we project a wide thin piece across the axis of the shaft, and provide it at the proper radial distance with a wrist on which we mount the packer $u'$. Our object in so constructing the cranks is twofold: first, so that they shall both be close to the needle and yet both be upon one side thereof, and, second, so that the compressor-arm T shall, as nearly as possible, oppose both packers.

In many machines the packers are placed one upon each side of the needle, and hence are widely separated, thus requiring two tripping-arms to oppose them to avoid vibrating the gavel, which would take place were a single resistant used and located between their planes of movement. By using either of the pin-holes in the shaft R the packer-cranks may be given a position either in front of the needle, as seen in Fig. 6 in full lines, or in rear thereof, as seen in dotted lines. By this choice of placing we are enabled to conform to the requirements of various conditions of grain. If the grain be very long—as, for instance, rye—the packers should be in rear of the needle; but in ordinary grain, where the great difficulty is in properly handling the butts, the packers will be in front of the needle. The packers are constructed with operating-points of such length as to reach well down into the swath of grain and at times to reach well outward to meet the swath. The orbits of movement of their points when packing the gavel are shown by dotted lines in Fig. 7. The packers are carried and supported by and on the wrists of the cranks. They extend upward from the wrists, (best shown in Figs. 7 and 17,) which extensions are controlled by the links $u^2$ and $u^3$. In the same figures the construction of the needle V is well shown as of a form much used, having a concentric extension, V', which forms a check to the passage of the straw when the needle is down.

Projecting from the needle-hub for a little distance in a direction opposite to that of the point of the needle is a stout short arm, $V^2$, projecting from either side of which is a stout pin, on which the links $u^2$ and $u^3$ are pivoted. As the needle is rocked, the axis of vibration of the links is moved. With the needle in the position shown in Fig. 7, the orbital movement of the packer-points will be that indicated by the dotted lines. Reaching well outward beyond the point of the needle, as they do, each packer-point will engage a wisp of straw and force it beneath and past the point of the needle and toward the tripping-arm. This will continue as long as the needle is at rest; but the instant the clutch is tripped the needle will begin its downward movement, and the upper extremities of the packers be carried over to the left, (when speaking of Fig. 7,) when the orbits of the packer-points will be wholly within the arc of the needle, as shown by the broken lines seen in the last-mentioned figure. By this simple means the packers are given an active and inert position at proper intervals.

To transfer the packers from one side of the needle to the other, the links $u^2$ and $u^3$ are transposed and turned over, when the positions of their outer pivoted ends are exactly correct to receive the packers when transposed to the other side of the needle.

Regarding the transposition of the packers, we think it proper to say that when they are in rear or at the grain-head side of the needle it will not be necessary to oppose them very squarely by the tripping-arm T, because the little amount that very long and hence heavy straw would be turned by the packers not directly opposed by the resistance would cut no especial figure, while the same amount of irregularity regarding positions would turn very short grain nearly or quite parallel with the direction of movement of the swath.

The needle and tying mechanism in detail and their operations as band-carrying and band-uniting mechanism, forming no part of this invention, need not be described; but the bundle-discharging arms, being in part novel, will not be omitted.

Referring to Fig. 3, the position of the bar F will be seen to be such as to cut off the path of sweep of the foremost discharge-arm, W. To meet this obstruction we joint the arm and provide means for folding it, which means consists of a curved deflecting-rod, $w$, (best seen in Figs. 2, 3, 6, and 7,) bolted to the lug $b^{10}$, and which curves outward to the rear and downward, where it is secured to the platform, where it is bolted, as seen in dotted and full lines in the figures referred to, where all the shapes are clearly shown.

To insure the straightening of the jointed discharge-arm in time to pass up through the slot in the binding-table, another deflecting-rod, $w'$, is used, secured to the knotter-frame at $w^2$, the shape of which may be seen in Figs. 2 and 7. By means of these rods the jointed arm is forced to escape the bar F and to then assume the position for acting upon the bundle. The rearmost discharge-arm is firmly secured to the knotter-driving wheel, but, being of a construction in common use, need not be described.

The operating parts of the grain platform consist of the usual conveying-canvas, with a toothed roller at its delivery end to effect a free discharge of the grain from the former. By the action of these the grain is brought well in reach of the packers.

It has been explained that the canvas-driving roller receives its rotations through the diagonal shaft $q^7$. This in turn is imparted to the toothed roller by means of a train of three gears immediately behind the rear face of the rear platform-sill, that lettered $N^2$ being on the journal of the roller N', $N^3$ being on the journal of the toothed roller, and $N^4$ intermediate the other two gears and revolving on a stud secured to the sill.

The delivery of the grain being continuous and the action of the binding mechanism intermittent, some kind of a receiver or its equivalent for the grain is necessary. This we have in effect by leaving room for the grain to heap up against the arc of the needle when it is down. The teeth of the stripping-roller are so deflected backward that they do not engage the straw with such force as to carry it forward unresistingly, but rather to force it away from itself. Deflected as shown, they are still competent to prevent the grain from falling through at the end of the delivery-canvas. The toothed roller is covered between its rows of teeth by sheets of iron, $x'$, screwed to the platform bottom boards at one end (see Figs. 1 and 17) and at their delivery end to the edge of the vertical board $x^2$.

$x^3$ and $x^4$ are sheets of iron screwed to the upper edge of the board $x^2$, and which slope upward (see Figs. 1 and 28) and form a grain-table. These being in effect secured to the platform rock with it, and the needle and knotting apparatus being secured to the frame, the grain-table changes its relation to the latter when the platform is tilted. When the front edge of the grain-platform is tilted downward, the parts of the binder-table, being above the axis of tilt, are swung forward, and by this movement the space between the breast-plate Y and the part $x^4$ is increased, and the space between the breast-plate Y and the part $x^3$ is decreased.

As the slots or spaces $y$ and $y'$ must be provided for the passage of the discharge-arms, we secure the plates $y^2$ and $y^3$ to the lower end of the breast-plate Y, and hence these do not tilt with the platform. These last plates are made so wide that they are overlapped by those $x^3$ and $x^4$, and the latter are supported by them. The width of $y^2$ and $y^3$ is such that as $x^3$ and $x^4$ move over them no opening is produced in the table other than the slots provided for the discharge-arms.

Referring now to Fig. 3, the plate $y^3$ will be seen with its outer end supported by resting on the top of the wooden piece $f$, bolted to the lugs of the frame, and $x^4$ by resting on $y^3$. Referring now to Figs. 6 and 7, the knotter-driving shaft $S^2$ is seen to project well beyond the knotter-driving gear $S^{10}$, which shaft is provided with a nut for holding said gear well in place. This nut has a circumferential groove, in which rests a crotched iron support, $y^6$, which extends upward to reach and is riveted to the outer end of the plate $y^2$, which is thus supported and in turn supports the plate $x^3$.

In order that the bundle may be deflected off from the discharge-arms, a curved extension, $Y'$, is riveted to the end of Y and secured to and supported by the knotter-frame.

The knotter-frame is supported on the projecting end of the shaft $S^2$ and needs no other support than one to prevent its rotation with the shaft. We provide the necessary support as follows: We bolt the breast-plate to the knotter-frame $M^3$, which is supported on the knotter-shaft in the usual manner. At $M'$, Figs. 7 and 17, is bolted a strong brace, $M^2$, that reaches from the lowermost part of the breast-plate to the side of bar F, Fig. 3, where it takes the bolt $f^2$. This last bolt also forms the pivotal point of the platform when tilted.

In carrying out the principles involved in our machine very many modifications may be made.

We do not wish to limit ourselves to the precise construction shown and claimed, but consider ourselves entitled to equivalents wherever substitutions may be made.

The butt-adjusting mechanism and the grain-wheel support we shall make the subjects of other applications and claims that may be made on the forms of construction shown. That involving the principle of poising the platform and binder by the harvester-gearing and binder-gearing will be so claimed in an application to be made by John F. Steward, one of the above-named petitioners.

What we claim is—

1. In a combined harvesting and binding machine, a metallic main frame having its forward end adapted to encircle the main wheel and its rear end provided with the two rigid rearwardly-extending arms, one above and the other below the grain-passage, said arms provided with bearings to sustain the binder-shafts lying in a fore-and-aft direction.

2. In a harvesting and binding machine, the combination of the main wheel, the harvester and binder frame formed complete in one rigid structure, its forward end adapted to encircle the main wheel and to sustain the harvester and binder gearing, and its rear end provided with the two rearwardly-extending arms, one above and the other below the grain-passage, said arms having bearings to sustain the binder-shafts lying in a fore-and-aft direction.

3. In a combined harvesting and binding machine, the combination of a main wheel, a rigid frame encircling said wheel and provided at its rear end with two rigid rearwardly-extending arms, one above and the other below the grain-passage, a binding mechanism mounted on the rear end of said frame, with upper and lower shafts carried by said arms, and harvester and binder driving-gear located on the forward end of the frame and driven from the main wheel, substantially as described, whereby the binder is supported rigidly in rear of the wheel, counterbalanced by the gearing in advance of said wheel, and the weight of both gearing and binder applied to the wheel to insure proper traction.

4. In a self-binding harvester, the main driving-wheel frame supported on the axle, the binder mechanism supported on said frame, and the platform pivotally supported on said frame, the draft-bars connecting the said platform to the said frame, all combined with the stretcher-bar $g^3$, substantially as described.

5. In combination with the main wheel and axle, the rigid main frame encircling the wheel, with the harvester and binder gear mounted on its forward end, and the binder mechanism carried on its rear end, the harvester-platform sustained at one side by the grain-wheel, the pivoted draft-bars G and $G'$, connecting the platform and frame, and means, substantially as described, adjustably supporting the stubble end of the platform from the main frame in rear of the main wheel.

6. The main driving-wheel frame, the binding mechanism mounted thereon, and the delivery-platform pivoted thereto substantially in line with the binding mechanism and suitably connected by draft-bars to said frame, combined with the adjustable braces $h^2$ and $h^5$, for sustaining the said frame in its upright position in relation to the said platform, substantially as described.

7. In a self binding harvester, the platform connected to the main driving-wheel frame by pivoted draft-bars and the said frame supported in its upright position by means of adjustable braces $h^2$ and $h^3$, combined with means for tilting the platform and retaining it in any position or adjustment, substantially as described.

8. In a self-binding harvester, the binding-tables $y^2$ $y^3$ Y, fixed in relation to the binding mechanism, combined with the platform pivoted, substantially as described, in relation to said binding mechanism and provided with the fore-and-aft tables $x^4$ and $x^3$, overlapping the edges of the first-named sections of the table, whereby the binder-table forms a complete support for the grain whatever the position of the tilt in relation to said binder mechanism, as set forth.

9. In a self-binding harvester, the combination of the main driving-wheel frame having the parallel longitudinal bars which form supports for the needle and knotter-driving shafts and having the axle bearing $b^7$, and the standard C, having the axle-bearing, whereby the side of the frame supporting one shaft is supported so high that the swath of the grain may be carried beneath it and the other shaft be beneath the swath, substantially as described.

10. In a self-binding harvester, the frame-plate E, having the tongue pivoted thereon and provided with the trunnions $e^{10}$ and $e^{11}$, and the draft-bars G and G′, connected thereto, the said plate E secured to the main frame, and the said draft-bars at their rear ends to the platform, all combined substantially as described.

11. The plate E, having the binder shaft bearings $e$ and $e'$, the driving-shaft bearings $e^2$, the crank-shaft bearings $e^3$, and the canvas-driving-shaft bearing $e^4$, substantially as described.

12. The needle, in combination with the packers, reversible at will as regards their position beside the said needle, substantially as described.

13. The tripping compressor-shaft having the arm $t$, combined with the flanged plate having the inclined portion $t^4$, for the purpose specified.

14. The rocking and longitudinally-movable tripping compressor-shaft provided with the arm $t$, combined with the adjustable flanged plate having the inclined portion $t^4$, substantially as described.

15. The combination of the rocking and longitudinally-movable tripping compressor-shaft provided with the arm $t$, and the adjustable plate $t^2$, having the flange $t^3$, with the inclined portion, whereby the said shaft is caused to move longitudinally and be retained in the position to which it is thus moved until the arm T returns to its position of rest, substantially as described.

16. The combination of the bearing-bracket T⁴, the longitudinally-moving shaft therein, and the adjustable flanged plate having the inclined portion journaled thereon, in combination with means for adjusting the plate in relation to the said bearing and shaft, substantially as described.

17. In a grain-binder, the longitudinally-movable rock-shaft T′ and the flanged plate having the incline $t^4$, and devices, substantially as described, offering a variable resistance to the longitudinal movement of said shaft.

18. The combination of the longitudinally-movable tripping rock-shaft with the spring T⁷, adjustable in its resistance to the endwise movement of said shaft, substantially as described.

19. In combination with the longitudinally-movable rock-shaft T′ and the tripping-lever, the intermediate mechanism, substantially as described, for imparting motion from one to the other.

20. The combination of the longitudinally-movable tripping-shaft and the lever pivoted on the frame, and one end connected with the shaft and the latter connected with the clutching device, substantially as described.

21. The tripping-lever T³, having the foot with the projecting toe reaching to and engaged by the cam-ring S⁶, all combined with the clutching device, substantially as described.

22. In a machine for harvesting and binding grain, the combination of the main wheel and its axle, the main frame mounted on said axle and extending in front and rear of the wheel, the harvester and binder gearing mounted on the forward end of the frame, the binding mechanism mounted on the rear end of the frame, the tongue or draft-pole jointed to the front end of the frame and connected thereto by tilting mechanism, the driver's seat sustained by the tongue, the main platform mounted at its outer end on the grain-wheel and connected at its inner end to the main frame by the draft-bars G and G′, and suspending devices connecting the inner end of the platform with the rear end of the main frame, substantially as described, whereby the weight of the entire structure is applied chiefly to the main wheel, the machine adapted to poise or balance upon said wheel, and the driver enabled to readily effect the adjustment of the platform.

23. In a grain-binding machine, the combination of a needle or binder-arm for laying the cord about the bundle and a packing mechanism for compressing the grain, said elements adapted for adjustment in relation to each other and in the direction of the length of the grain, so that the packer may be caused to act upon the grain either in front or in rear of the point at which the cord is laid, as occasion may require.

JOHN F. STEWARD.
GEORGE H. STEWARD.

Witnesses:
J. S. STEWART,
FRANK C. STEWART.